United States Patent [19]
Rouge et al.

[11] Patent Number: 5,968,233
[45] Date of Patent: Oct. 19, 1999

[54] METHOD AND PLANT FOR THE TREATMENT OF A GAS MIXTURE BY PRESSURE-SWING ADSORPTION

[75] Inventors: Dominique Rouge, Malakoff; Jacques Labasque, Versailles; Jean-Yves Letellier, Massy, all of France

[73] Assignee: L'Air Liquide, Societe Anonyme Pour L'Etude et L'Exploitation des Procedes Georges Claude, Paris Cedex, France

[21] Appl. No.: 09/011,855

[22] PCT Filed: Jul. 17, 1997

[86] PCT No.: PCT/FR97/01335

§ 371 Date: Feb. 19, 1998

§ 102(e) Date: Feb. 19, 1998

[87] PCT Pub. No.: WO98/03246

PCT Pub. Date: Jan. 29, 1998

[30] Foreign Application Priority Data

Jul. 18, 1996 [FR] France ................................... 96 09019

[51] Int. Cl.⁶ ................................................. B01D 53/047
[52] U.S. Cl. .................................. 95/96; 95/101; 95/130; 96/130; 96/144
[58] Field of Search .............................. 95/96–106, 130; 96/130, 144

[56] References Cited

U.S. PATENT DOCUMENTS

| | | | |
|---|---|---|---|
| 3,430,418 | 3/1969 | Wagner | 95/100 |
| 3,564,816 | 2/1971 | Batta | 95/100 |
| 3,636,679 | 1/1972 | Batta | 95/100 |
| 3,839,847 | 10/1974 | Banikiotes et al. | 95/96 |
| 3,973,931 | 8/1976 | Collins | 95/99 |
| 4,026,680 | 5/1977 | Collins | 55/26 |
| 4,077,780 | 3/1978 | Doshi | 95/100 |
| 4,194,891 | 3/1980 | Earls et al. | 95/98 |
| 4,259,091 | 3/1981 | Benkmann | 95/98 |
| 4,421,530 | 12/1983 | Dalton, Jr. et al. | 95/99 |
| 4,444,727 | 4/1984 | Yanagihara et al. | 422/223 |
| 4,781,735 | 11/1988 | Tagawa et al. | 95/101 |
| 4,969,935 | 11/1990 | Hay | 95/98 |
| 5,122,164 | 6/1992 | Hirooka et al. | 95/98 X |
| 5,223,004 | 6/1993 | Etéve et al. | 95/98 |
| 5,246,676 | 9/1993 | Hay | 95/98 X |
| 5,254,154 | 10/1993 | Gauthier et al. | 95/100 X |
| 5,298,226 | 3/1994 | Nowobilski | 422/171 |
| 5,348,573 | 9/1994 | Tomassian et al. | 96/151 |
| 5,411,578 | 5/1995 | Watson et al. | 95/101 |
| 5,672,195 | 9/1997 | Moreau et al. | 95/96 |
| 5,711,787 | 1/1998 | Neill et al. | 95/96 |
| 5,846,294 | 12/1998 | Doong | 95/98 |

FOREIGN PATENT DOCUMENTS

| | | |
|---|---|---|
| 0 526 343 | 2/1993 | European Pat. Off. . |
| 0 719 578 | 7/1996 | European Pat. Off. . |

*Primary Examiner*—Robert Spitzer
*Attorney, Agent, or Firm*—Young & Thompson

[57] ABSTRACT

Each adsorber (1, 2) is dimensioned in such a way that it operates in substantially adiabatic mode and its production dead volume (27), which is the free volume in permanent communication with the outlet side end of the mass of adsorbent (6), is between about 10% and 60% of the volume of the mass of adsorbent. Oxygen may thus be produced from atmospheric air.

11 Claims, 1 Drawing Sheet

METHOD AND PLANT FOR THE TREATMENT OF A GAS MIXTURE BY PRESSURE-SWING ADSORPTION

FIELD OF THE INVENTION

The present invention relates to a method for treating a gas mixture by pressure-swing adsorption, of the type in which, in at least one vessel containing a mass of adsorbent, a cycle is implemented which comprises (a) a production phase in which the mixture is circulated, in a so-called cocurrent direction, from one end referred to as the inlet, to another end, referred to as the outlet, of the vessel, and (b) a phase of regenerating the adsorbent, by the vessel having, on the one hand, on its outlet side and beyond the mass of adsorbent in the cocurrent direction, a free volume, referred to as the production dead volume, which is in permanent communication with the outlet side end of the mass of adsorbent, and on the other hand, on its inlet side, before the mass of adsorbent in the cocurrent direction, a free volume, referred to as the feed dead volume, which is in permanent communication with the inlet side end of the mass of adsorbent.

The invention applies in particular to the production of oxygen-enriched air, in particular containing at least 90% oxygen, from atmospheric air.

The pressures referred to are absolute pressures.

The expression "pressure-swing adsorption" (PSA) is to be understood in the broad sense, that is to say the high pressure of the cycle is greater than or equal to atmospheric pressure and the low pressure of the cycle is less than or equal to atmospheric pressure.

BACKGROUND OF THE INVENTION

It is known that the performance of a PSA method can be assessed through a number of factors, which in the aforementioned example are as follows:

the yield, which is the ratio of the volume of gas (for example oxygen) produced to the volume of said gas contained in the gas mixture which is treated (volumes measured under standard temperature and pressure conditions);

the productivity, which is the quantity of gas produced per unit time and unit volume of adsorbent (unit: $m^3(stp)/h.m^3$);

the specific energy, which is the energy consumed per unit volume of product gas, measured under standard temperature and pressure conditions (unit: $kWh/m^3(stp)$); and the investment, which is the cost of a standard plant carrying out the method (unit: FF).

When the parameters of a PSA plant are altered, the four factors mentioned above are generally affected in different ways. It is therefore particularly difficult to predict what the final cost of the product gas (in particular oxygen) will be, and especially since a number of relatively poorly understood physical phenomena, such as the adsorption/desorption kinetics, are affected.

The cost C of the product gas can be defined by the following formula:

$$C=((ES'p_e)+(cc'I))/PA, \text{ where}$$

ES represents the specific energy
$p_e$ represents the price of the energy
cc represents a capital charge which covers not only the amortization, but also the maintenance, taxes, etc.

I is the investment, and
PA is the annual production.

C thus represents the unit cost of the product gas.

SUMMARY OF THE INVENTION

The object of the invention is to make it possible to obtain a low production cost, in particular with minimized outlay in terms of specific energy and/or reduced investment, in a way which is particularly convenient and straightforward for designing and using the plant.

To this end, the invention relates to a method of the aforementioned type, wherein:

the ratio S/V, where S denotes the external heat exchange surface area for the assembly consisting of the mass of adsorbent and the two dead volumes, and where V is the volume of the same assembly, is selected, at a value of less than 6 $m^{-1}$; and the production dead volume is selected at a value of between substantially 10% and substantially 60% of the volume of the mass of adsorbent.

If, for a given cost of the product gas, it is desired to minimize the outlay in terms of specific energy, the production dead volume will advantageously be selected to be close to 10% of the volume of the mass of adsorbent.

If, however, the intention is to favor low investment, the production dead volume will advantageously be selected to be close to 60% of the volume of the mass of adsorbent.

The invention also relates to a plant intended for implementing the method defined above.

This plant, of the type comprising at least one vessel which contains a mass of adsorbent and defines an inlet through which the mixture enters in the production phase, and an outlet through which the production gas emerges, the mixture circulating through the vessel in a so-called cocurrent direction during the adsorption phase, by the vessel having, on the one hand, on its outlet side and beyond the mass of adsorbent in the cocurrent direction, a free volume, referred to as the production dead volume, which is in permanent communication with the outlet side end of the mass of adsorbent, and on the other hand, on its inlet side, before the mass of adsorbent in the cocurrent direction, a free volume, referred to as the feed dead volume, which is in permanent communication with the inlet side end of the mass of adsorbent, is one wherein the ratio S/V, where S denotes the external heat exchange surface area for the assembly consisting of the mass of adsorbent and the two dead volumes, and where V is the volume of the same assembly, is less than 6 $m^{-1}$; and the production dead volume has a value of between substantially 10% and substantially 60% of the volume of the mass of adsorbent.

The adsorbent may, in particular, be a molecular sieve comprising at least one zeolite of the 5A or LiX type.

Further, the plant may, in particular, comprise one, two or three identical vessels.

BRIEF DESCRIPTION OF THE DRAWINGS

Illustrative embodiments of the invention will now be described, with reference to the appended drawings, in which.

DETAILED DESCRIPTION OF THE INVENTION

Figure 1:
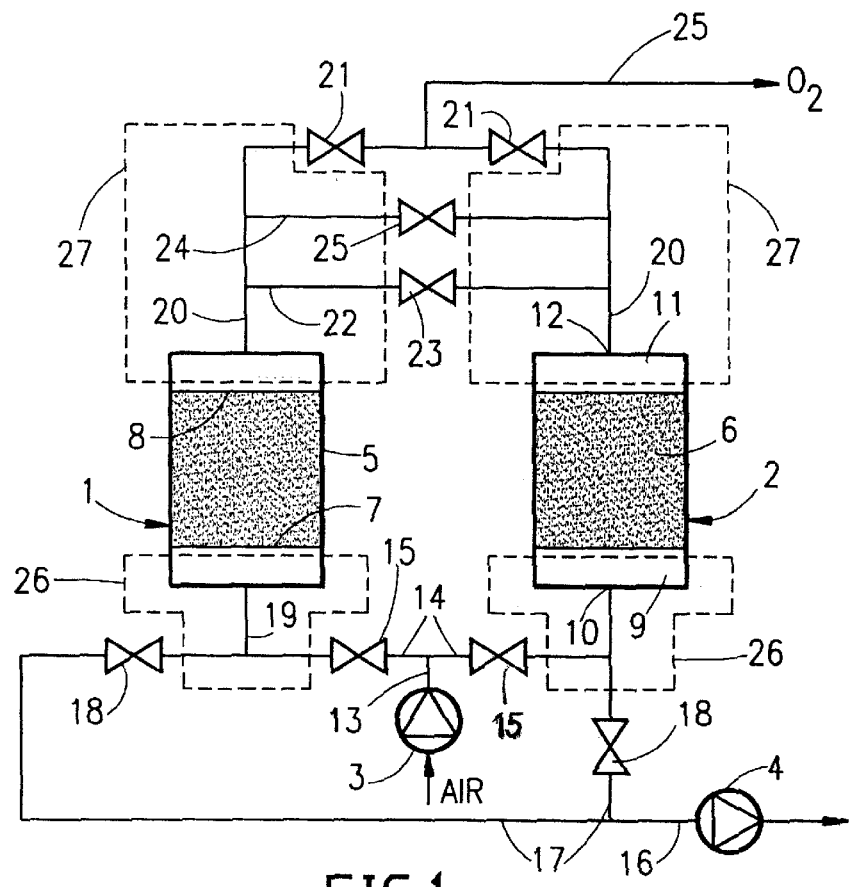
FIG. 1 schematically represents a plant according to the invention.

The plant represented in FIG. 1 is intended to produce oxygen at a purity at least equal to 90% from atmospheric air. It essentially comprises two identical adsorbers 1 and 2, a compressor 3, a vacuum pump 4 and a set of pipes and valves. It further comprises the customary regulating and control means which make it possible to automate the cycle described below.

In the embodiment schematically represented in FIG. 1, each adsorber 1, 2 comprises a bottle 5 of cylindrical general shape with a vertical axis, in which a mass or bed of adsorbent 6 is held between a lower, horizontal inlet grille 7 and an upper horizontal outlet grille 8. There is thus a free space 9 between the grille 7 and the inlet, or lower end, 10 of the bottle and another free space 11 between the grille 8 and the outlet, or upper end, 12 of the bottle.

The compressor or blower 3 takes atmospheric air in and delivers it, under a moderate excess pressure, to a feed pipe 13 connected to the inlet 10 of the two adsorbers via respective pipes 14, each fitted with a valve 15. Similarly, the intake of the pump 4 is connected to a purge pipe 16, itself connected to the two inlets 10 via respective pipes 17, each fitted with a valve 18. For each adsorber, the pipe 14 and the pipe 17 join to form a pipe 19 which feeds into the inlet 10.

A production pipe 20, fitted with a valve 21, leads off from the outlet 12 of each adsorber. An equilibration pipe 22 fitted with a valve 23, and an elution pipe 24 fitted with a valve 25 connect in parallel points of the two pipes 20 lying upstream of the valves 21 relative to the gas flow direction corresponding to the production phase of the adsorber. Downstream of the valves 21, the pipes 20 join to form a production pipe 25.

A "feed dead volume" or FDV 26, as well as a "production dead volume" or PDV 27, which are indicated by dashed lines in FIG. 1, are defined for each adsorber.

The FDV 26 is the volume which is permanently in communication with the inlet end of the bed 6. In the example which is illustrated, it is therefore the sum of the volume of the pipe 14 downstream of the valve 15, the volume of the pipe 17 upstream (relative to the pumping direction) of the valve 18, the pipe 19 and the free inlet space 9.

Similarly, the PDV 27 is the sum of the volumes of the pipe 20 between the outlet 12 of the bottle 5 and the valve 21, the pipe 22 between the pipe 20 and the valve 23, the pipe 24 between the pipe 20 and the valve 25, and the free outlet space 11.

The dimensioning and configuration of the adsorbers 1 and 2 and of the pipes in the plant are selected in such a way that the following two relationships are satisfied for each adsorber:

(1) The ratio S/V, where S denotes the external heat exchange surface of the assembly consisting of the bed of adsorbent 6 and the dead volumes 26 and 27, and/or V is the volume of the same assembly, is less than 6 m$^{-1}$. The purpose of this dimensioning is to ensure that the adsorber operates substantially adiabatically.

(2) The ratio of the PDV 27 to the volume of the bed of adsorbent 6 is between about 10% and 60%.

In practice, the plant will be produced perfectly symmetrically.

Figure 2:
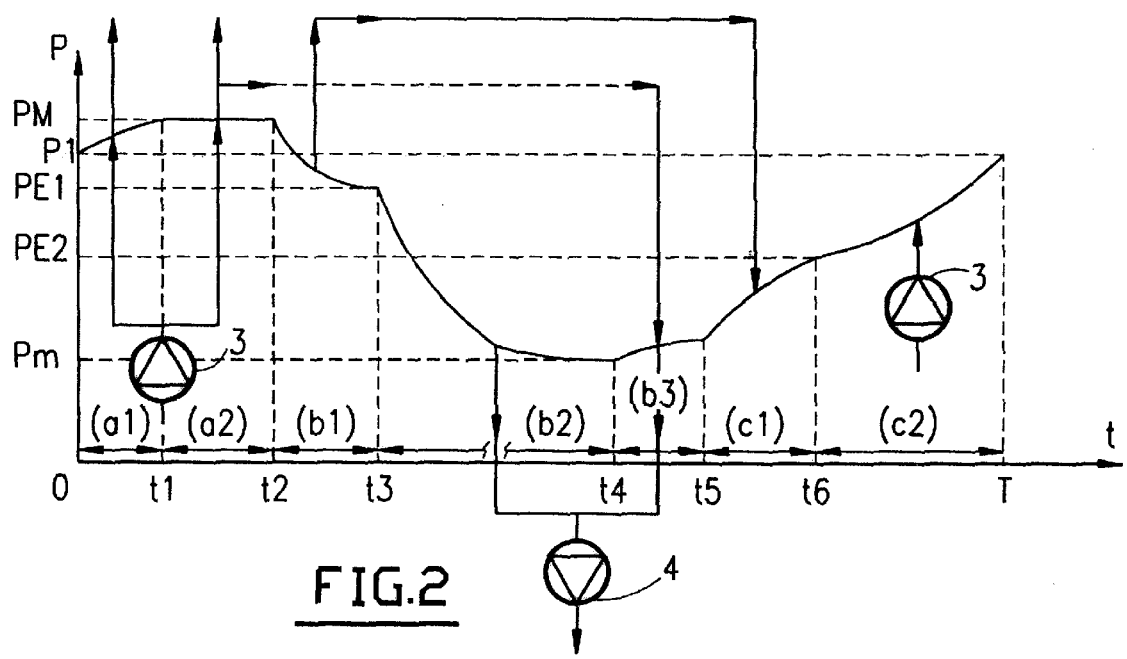
FIG. 2 is a diagram which illustrates a cycle implemented in the plant in FIG. 1.

Using this plant, a cycle as illustrated in FIG. 2 with reference to the adsorber 1, is set up in each adsorber. If T denotes the duration of the cycle, the operation of the adsorber 2 is derived therefrom by a time shift of T/2. In the example in question, T=80 s.

In FIG. 2, where the time t is plotted on the abscissa and the absolute pressure P is plotted on the ordinate, the lines directed by arrows indicate the movements and destinations of the gas flows from and to the adsorber.

An example of the complete cycle will now be described for an adsorber, for example the adsorber 1, with reference to FIGS. 1 and 2. In the example in FIG. 2, the cycle proceeds between two extreme pressures, namely a high or maximum pressure PM, which lies between atmospheric pressure and about $2 \cdot 10^5$ Pa and more generally between about 1 and $1.6 \cdot 10^6$ Pa, and a low or minimum pressure Pm between about $0.2 \cdot 10^5$ Pa and $0.5 \cdot 10^5$ Pa.

The cycle represented by way of illustration includes the following successive phases:

(a) From t=0 to t2, an adsorption phase at a pressure varying from an intermediate pressure P1 to the high pressure PM of the cycle, P1 being about $0.1 \cdot 10^5$ Pa less than PM. In this phase, the air to be treated is introduced at the inlet of the adsorber by means of the compressor 3.

This phase comprises a first step (a1), from t=0 to t1, in which all of the gas leaving the outlet of the adsorber is sent to the production pipe 25, and from t1 to t2, a second step (a2) in which some of the product gas is further sent in countercurrent to the other adsorber, which is then undergoing the elution step (b3) described below.

(b) From t2 to t5, a regeneration phase comprising:

from t2 to t3, a first cocurrent decompression step (b1), the decompression gas being sent in countercurrent to the other adsorber in the first countercurrent recompression step (b4) described below. At t3, the pressure is PE1<P1.

From t3 to t4, a step of purging by countercurrent pumping using the pump 4, to the low pressure Pm of the cycle;

from t4 to t5, an elution/pumping step, optionally accompanied by a slight rise in pressure. During this step, the adsorber receives production gas in countercurrent from the other adsorber which is undergoing the production step (a2), as seen above.

(c) From t5 to T, a recompression phase comprising from t5 to t6, a first countercurrent recompression step (c1) to a pressure PE2<PE1, using gas from the first cocurrent decompression of the other adsorber which is undergoing step (b1); and from t6 to T, a final cocurrent recompression step (c2) using air to be treated, without extracting production gas, to the pressure P1 using the compressor 3.

Simulations were carried out to evaluate the performance factors indicated above. The results, for an oxygen level of 93% in the product gas, are collated in Tables I and II below, in which the base 100 has been adopted for all the factors for a PDV of 10%.

The simulations firstly dealt with a substantially isothermal operating mode, that is to say with the aforementioned ratio S/V markedly greater than 6. The results are indicated in Table I below.

TABLE I

| PDV (%) | Yield | Productivity | Specific energy | Investment | Oxygen cost |
|---|---|---|---|---|---|
| 10% | 100 | 100 | 100 | 100 | 100 |
| 40% | 94 | 102 | 107 | 101 | 103 |

It can be seen that the productivity of the method is slightly improved by quadrupling the production dead volumes. However, the yield is degraded to such an extent that the specific energy of the unit is significantly impaired. With the investment remaining approximately the same, this leads to an increased cost of the oxygen produced.

This is in accordance with what is indicated in the work "Gas separation by adsorption processes" by Ralph T. Yang, Butterworths Series in Chemical Engineering, Butterworths, 1987.

The simulations then dealt with the substantially adiabatic operating mode explained above, that is to say with the ratio S/V much less than 6, specifically equal to 3. The results are indicated in

TABLE II

| PDV (%) | Yield | Productivity | Specific energy | Investment | Oxygen cost |
|---|---|---|---|---|---|
| 5% | 100 | 97 | 100 | 103 | 102 |
| 10% | 100 | 100 | 100 | 100 | 100 |
| 40% | 98 | 106 | 102 | 98 | 99 |
| 60% | 96 | 111 | 105 | 97 | 100 |
| 80% | 92 | 112 | 110 | 98 | 102 |

Surprisingly, in substantially adiabatic mode, the productivity is greatly promoted by increasing the PDV, although the associated degrading of the yield is much less pronounced than in substantially isothermal mode operation. This is probably due to the following twofold phenomenon. On the one hand, the presence of a large PDV gives an increased gas volume available for elution. On the other hand, the heat of adsorption heats the end of the bed of adsorbent as well as the gas volume in question. Overall, this favors the regeneration.

In economic terms, this twofold change in the cycle performance gives rise to a range of production dead volumes in which the cost of the oxygen produced is minimal. Here, the optimum zone is clearly [10%; 60%]. In this range, it is then possible to promote either the energy (PDV=10%) or the cost of the plant (PDV=60%). It is thus easy, according to the user's wishes and the local energy cost conditions, to adapt the industrial unit to obtain the method with the highest performance.

The results above were confirmed experimentally with a pilot unit, with a ratio S/V=2, as indicated by the following table.

TABLE III

| PDV (%) | Yield | Productivity | Specific energy | Investment | Oxygen cost |
|---|---|---|---|---|---|
| 10% | 100 | 100 | 100 | 100 | 100 |
| 20% | 100 | 103 | 100 | 98 | 99 |

As regards the production of oxygen, the invention applies to the various usable adsorbents (molecular sieves of the 5A or LiX type, in particular), to plants including more or fewer than two adsorbers, and to various oxygen purities, between about 90 and 95%, which are customarily obtained in PSA plants.

It should be noted that, if the bed of adsorbent 6 is preceded by a second bed of adsorbent, in particular alumina, intended essentially to dehydrate the incoming air, this second bed should be considered as forming part of the feed dead volume, because the corresponding volume does not participate in the desired N2/O2 separation.

We claim:

1. A method for treating a gas mixture by pressure-swing adsorption in which, in at least one vessel containing a mass of adsorbent, a cycle is implemented which comprises: (a) a production phase in which the mixture is circulated in a cocurrent direction from an inlet end to an outlet end of the vessel, and (b) a regeneration phase in which the adsorbent is regenerated; the vessel having on its outlet side and beyond the mass of adsorbent in the cocurrent direction, a free production dead volume which is in permanent communication with the outlet side end of the mass of adsorbent, and on its inlet side, before the mass of adsorbent in the cocurrent direction, a free feed dead volume, which is in permanent communication with the inlet side end of the mass of adsorbent, wherein the ratio S/V, where S denotes an external heat exchange surface area for an assembly consisting of the mass of adsorbent and the two dead volumes, and V is the volume of the same assembly, is selected at a value of less than 6 $m^{-1}$; and the production dead volume is selected at a value of between substantially 10% and substantially 60% of the volume of the mass of adsorbent.

2. The method according to claim 1, wherein in order to minimize the outlay in terms of specific energy, the production dead volume is selected to be close to 10% of the mass of adsorbent.

3. The method according to claim 1, wherein in order to minimize the investment outlay, the production dead volume is selected to be close to 60% of the volume of the mass of adsorbent.

4. The method according to claim 1, wherein the gas mixture contains nitrogen and oxygen, and the production gas is an oxygen-enriched gas.

5. The method according to claim 4, wherein the production gas contains at least 90% oxygen.

6. The method according to claim 4, wherein the gas mixture is air.

7. The method according to claim 1, wherein the regeneration phase comprises a step of evacuating the vessel.

8. A plant for the treatment of a gas mixture by pressure-swing adsorption, comprising: in at least one vessel which contains a mass of adsorbent and defines an inlet through which the mixture enters in a production phase, and an outlet through which a production gas emerges, the mixture circulating through the vessel in a cocurrent direction during an adsorption phase; the vessel having on its outlet side and beyond the mass of adsorbent in the cocurrent direction, a free production dead volume, which is in permanent communication with the outlet side end of the mass of adsorbent, and on its inlet side, before the mass of adsorbent in the cocurrent direction, a free feed dead volume, which is in permanent communication with the inlet side end of the mass of adsorbent, wherein the ratio S/V, where S denotes an external heat exchange surface area for an assembly consisting of the mass of adsorbent and the two dead volumes, and V is the volume of the same assembly, is less than 6 $m^{-1}$; and the production dead volume has a value of between substantially 10% and substantially 60% of the volume of the mass of adsorbent.

9. The plant according to claim 8, wherein the adsorbent is a molecular sieve comprising at least one of a 5a zeolite and a LiX zeolite.

10. The plant according to claim 8, wherein said at least one vessel comprises at least two identical vessels.

11. The plant according to claim 8, further comprising a vacuum pump connectable to the inlet of the vessel.

* * * * *